Sept. 2, 1952     O. R. NEMETH     2,608,903
DEVICE FOR VIEWING PICTURES
Filed Feb. 27, 1950
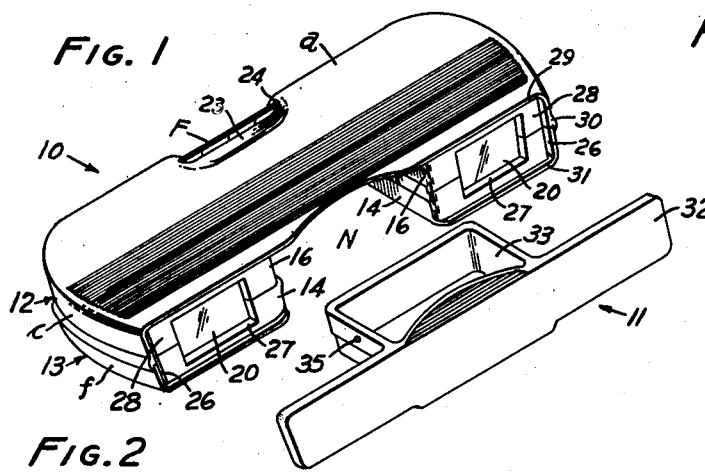
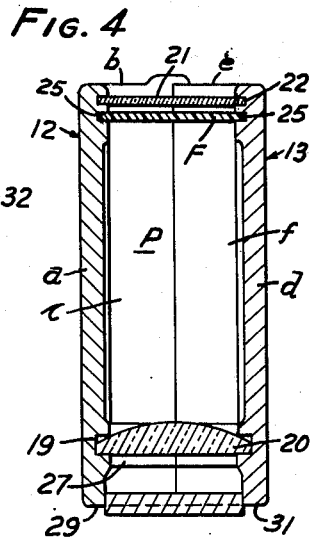
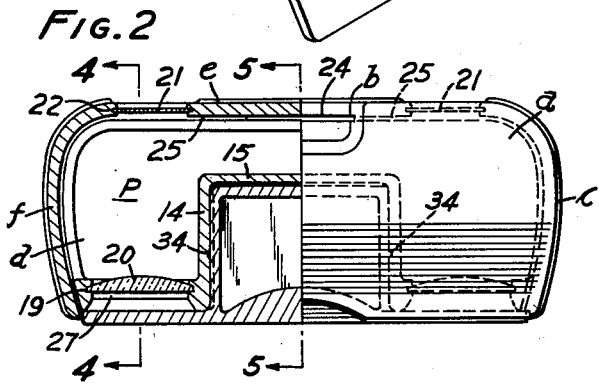
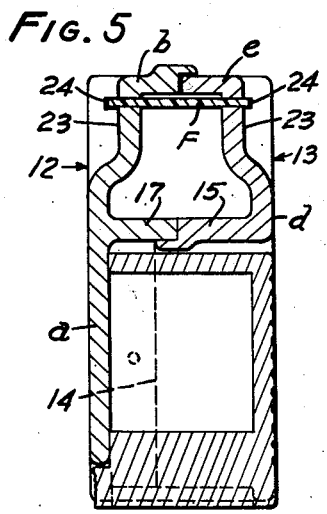
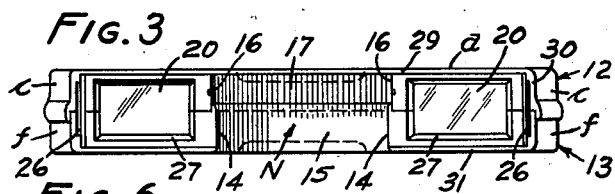
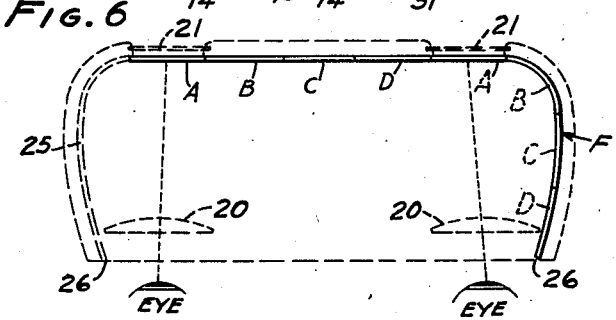
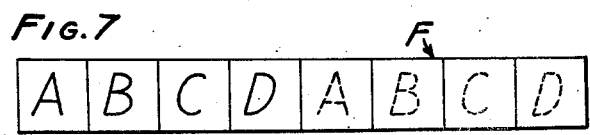
INVENTOR,
OTTO R. NEMETH,
BY
ATTORNEY.

Patented Sept. 2, 1952

2,608,903

UNITED STATES PATENT OFFICE 2,608,903

DEVICE FOR VIEWING PICTURES

Otto Randolph Nemeth, Los Angeles, Calif.

Application February 27, 1950, Serial No. 146,603

2 Claims. (Cl. 88—31)

This invention relates generally to the class of optics and is directed particularly to a device for viewing pictures.

The invention has for its principal object to provide an improved and novel form of three dimensional or stereoscopic viewing device for use in association with a film strip carrying a plurality of duplicate pictures which when brought into a prescribed position in the device will be viewed in such a manner as to give a three dimensional effect to the single picture which the eyes of the viewer sees or, in other words, show the picture with stereoscopic effect.

Another object of the invention is to provide a film strip viewing device of the character stated, which is designed in a novel manner to facilitate the easy shifting of a film strip in a step by step manner so as to successively bring into viewing position two substantially identical pictures.

Another object of the invention is to provide in a device of the character stated, a cover member for the eye piece lenses which carries a receptacle adapted to enter into a nose opening located between the eye piece lenses, which receptacle provides a storage place for additional film strips.

The invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawings:

Figure 1 is a view showing in perspective a viewer constructed in accordance with the present invention, with the cover plate and film receptacle removed from the body of the device.

Figure 2 is a horizontal sectional view through approximately one half of the device, the remaining half being shown in top plan.

Figure 3 is a view in elevation of the rear of the device with the cover plate and receptacle removed.

Figure 4 is a sectional view taken substantially on the line 4—4 of Figure 2.

Figure 5 is a sectional view taken substantially on the line 5—5 of Figure 2.

Figure 6 is a diagrammatic view illustrating the position assumed by a film strip in the device and the position of the eyes of the viewer.

Figure 7 is a diagrammatic view of a film strip showing the arrangement of the substantially duplicate pictures.

Referring now more particularly to the drawing the numeral 10 generally designates the viewer device as a whole while the numeral 11 generally designates the cover and film receptacle or drawer which is combined with or secured to the device 10 when the latter is not in use and functions to protect the eye lenses.

The viewer 10 is formed preferably in the two halves which are respectively designated 12 and 13 for the upper and lower halves. As shown the upper half 12 comprises a long top wall $a$ which extends the full width of the device and which includes the integral front and end walls $b$ and $c$.

The lower half 13 comprises a bottom wall $d$ and the front and end walls $e$ and $f$ respectively. The wall $d$ for the bottom half 13 is cut out or recessed between its ends and the edge of this recessed portion is outlined by the upstanding flanges 14 and 15. As shown in Figure 2 the flanges 14 are spaced inwardly from the end walls of the upper and lower sections and the flange 15 is spaced rearwardly from the front walls of the upper and lower sections.

The upper section likewise has formed upon the under side of the top wall $a$, depending flanges 16 and 17 which correspond respectively to the flanges 14 and 15 and which meet the latter in edge abutting relation as is clearly shown in Figure 5. Likewise the edges of walls $b$ and $c$ butt against and are sealed to the edges of the walls $e$ and $f$ of the lower half or section of the device. Thus assembled there are provided the horizontally spaced viewing passages P which have between them the rearwardly and downwardly opening space N which provides a nose receiving recess for the user of the device.

The side walls of the device at the rear ends of the passages P are suitably grooved or channelled as indicated at 19 to receive the edges of lenses 20 which are preferably of synthetic resin material such as Lucite.

In line with the lenses 20, through the sight passages P, are front translucent windows 21 which may be formed of Celluloid or the like and which are set into grooves or channels 22 formed in suitable openings in the front walls $b$—$e$ of the two sections of the viewer.

The top wall $a$ and the bottom wall $d$ are each provided midway between the windows 21 with the depressed portions 23 and each of these depressed portions has opening therethrough a slot 24 which parallels the adjacent front walls $b$—$e$.

Each of these slots 24 has leading into it a channel 25 which follows the line of or parallels the front and end walls of the upper and lower sections, there being an upper channel and a lower channel spaced apart vertically a distance equal to the width of the picture film which is to be used in the device. As shown in Figure 2 these channels and the slots 24 pass along the inner sides of the windows 21 and the channels connect at their two ends with the vertical rear slots 26 each of which is located at the outer side of a lens 20 as clearly shown in Figures 2 and 3. Thus it will be seen that a strip of film such as that illustrated diagrammatically in Figure 7 and generally designated F, of the proper width, may be inserted into one slot and will follow the channels 25 around to be carried across the rear of the windows 21 and when positioned behind the windows a portion of the top and bottom edge of the film strip will project through the slots 24 as shown in Figures 1 and 5 so that the person using the device can readily engage the edge of the film with his fingers and shift it as desired.

The film strip shown in Figure 7 is illustrated as having four duplicate pictures which are designated solid and dotted A, solid and dotted B, solid and dotted C and solid and dotted D. Inasmuch as the device is intended to produce the illusion of a third dimension or is designed to give a stereoscopic effect the pairs of pictures are not exact duplicates. This is the usual practice in combining pairs of pictures for use in stereoscopic viewers.

It will be readily seen that the spacing between any two pictures of a pair is the same as the spacing between the Celluloid windows 21. This is shown in Figure 6 where the pictures solid A and dotted A are behind the windows and as the film strip is moved to the left the succeeding pictures solid and dotted B etc. may be shifted into position for viewing.

As shown the eye lenses 20 are set forwardly slightly, being fixed in openings 27 in the rectangular back walls 28 which are formed integral with the adjacent walls and flanges of the top and bottom sections of the device. Thus there is provided a shallow recess defined by narrow top, bottom and outer side flanges 29, 30 and 31 respectively in which are received the end portions of a long rectangular plate 32 forming a part of the eye lens cover member 11. This plate 32 also has formed as an integral part thereof the receptacle 33 which is of a width and height to snugly enter into the nose opening or recess N when the plate 32 is in lens covering position. This receptacle 33 provides additional storage space for film strips of the character described.

In order to maintain the cover plate and receptacle in position opposite side walls of the receptacle are each provided with a raised button 34 which snaps into a suitable depression 35 when the receptacle is pushed into position.

From the foregoing it will be readily apparent that there is provided in the present invention a simple and novel three dimensional viewer in which use may be made of film strips having pairs of pictures suitably spaced to be brought into viewing position between the eye lenses 20 and the translucent windows 21. By reason of the depression 23 formed in the top and bottom walls of the device with the slots formed therethrough for the exposure of the top and bottom edges of the film, the user of the viewer can easily shift the film to bring a new set of pictures in view, without removing the device from his eyes.

I claim:

1. The combination with a stereoscope comprising a relatively flat hollow unit having wide top and bottom walls and narrow vertical front and rear walls, the unit including windows in the front walls and lenses in the rear walls with means for mounting a film strip therebetween; of means providing a nose space between the lenses comprising a recess formed in the bottom wall from the rear edge thereof, partitioning walls extending up from and outlining the edge of the recess to and joining the top wall, a cover plate positioned against said rear wall in covering position over said lenses, and a receptacle forming a part of the cover plate and extending into the said recess.

2. The invention as set forth in claim 1, wherein said top and bottom walls project at their back edges beyond the back wall and said cover plate fits snugly between said projecting edges.

OTTO RANDOLPH NEMETH.

REFERENCES CITED

The following references are of record in the file of this patent:

UNITED STATES PATENTS

| Number | Name | Date |
| --- | --- | --- |
| 1,237,940 | Morrison | Aug. 21, 1917 |
| 2,003,480 | De Vry | June 4, 1935 |
| 2,029,415 | Dennis | Feb. 4, 1936 |
| 2,117,910 | Rossman | May 17, 1938 |
| 2,122,649 | Kahn | July 5, 1938 |
| 2,142,606 | Debrie | Jan. 3, 1939 |
| 2,199,305 | Dewey | Apr. 30, 1940 |
| 2,207,483 | Hennicke et al. | July 9, 1940 |
| 2,290,307 | Wicker | July 21, 1942 |
| 2,387,758 | Jaros | Oct. 30, 1945 |
| 2,451,544 | Farrell | Oct. 19, 1948 |